Nov. 29, 1966  M. L. SMITH  3,287,882
BALE CLOSING AND SEALING APPARATUS
Filed July 1, 1963  12 Sheets-Sheet 1

INVENTOR.
MURL L. SMITH
BY Meyer, Baldwin, Doran & Egan
ATTORNEYS

Nov. 29, 1966        M. L. SMITH            3,287,882
              BALE CLOSING AND SEALING APPARATUS
Filed July 1, 1963                          12 Sheets-Sheet 2

INVENTOR.
MURL L. SMITH
BY
Meyer, Baldwin, Doran & Egan
ATTORNEYS

Nov. 29, 1966  M. L. SMITH  3,287,882
BALE CLOSING AND SEALING APPARATUS
Filed July 1, 1963  12 Sheets-Sheet 3
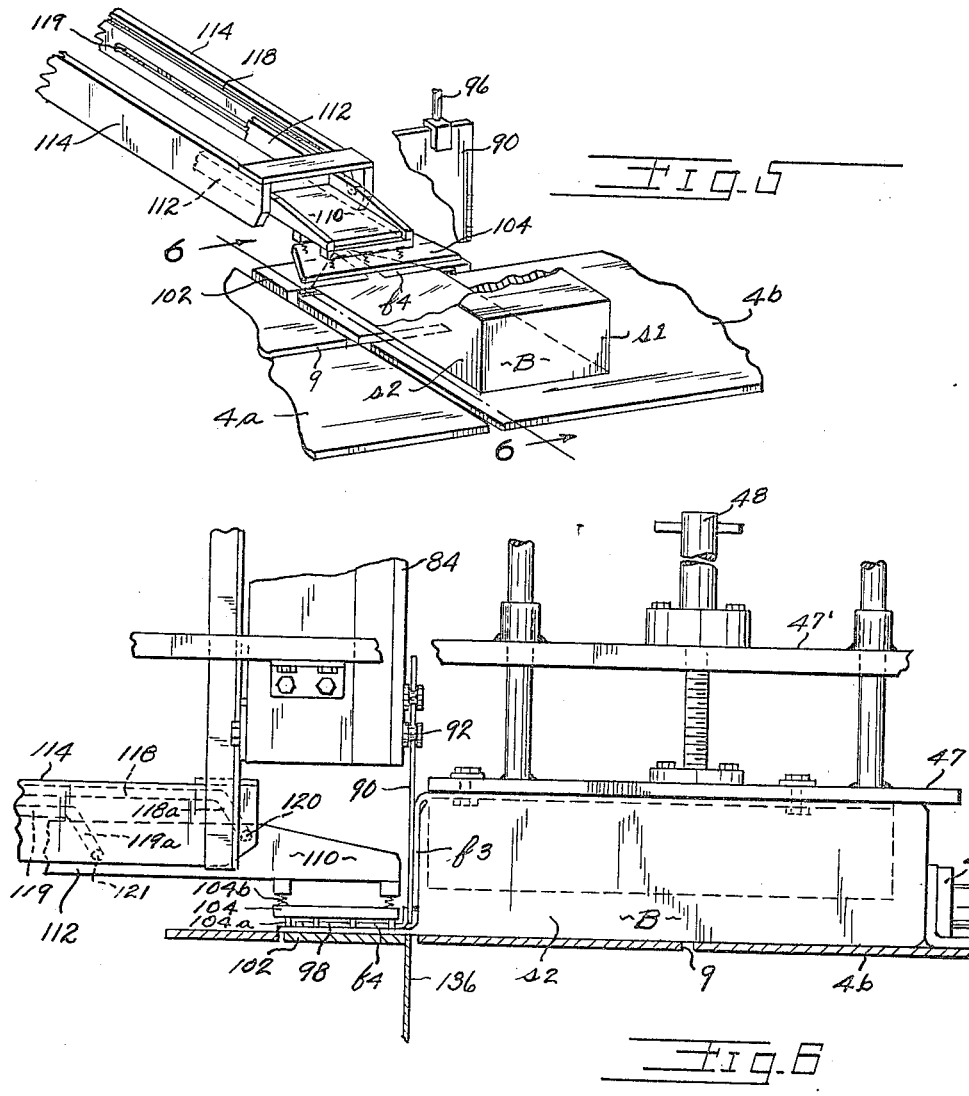
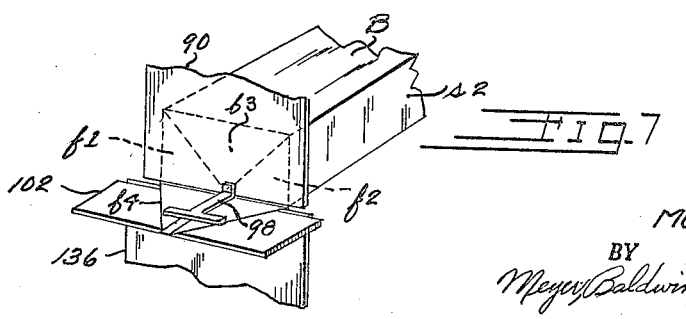
INVENTOR.
MURL L. SMITH
BY
Meyer, Baldwin, Doran & Egan
ATTORNEYS Nov. 29, 1966    M. L. SMITH    3,287,882
BALE CLOSING AND SEALING APPARATUS
Filed July 1, 1963    12 Sheets-Sheet 4

INVENTOR.
MURL L. SMITH
BY
Meyer, Baldwin, Doran & Egan
ATTORNEYS

Nov. 29, 1966     M. L. SMITH     3,287,882
BALE CLOSING AND SEALING APPARATUS
Filed July 1, 1963     12 Sheets-Sheet 5
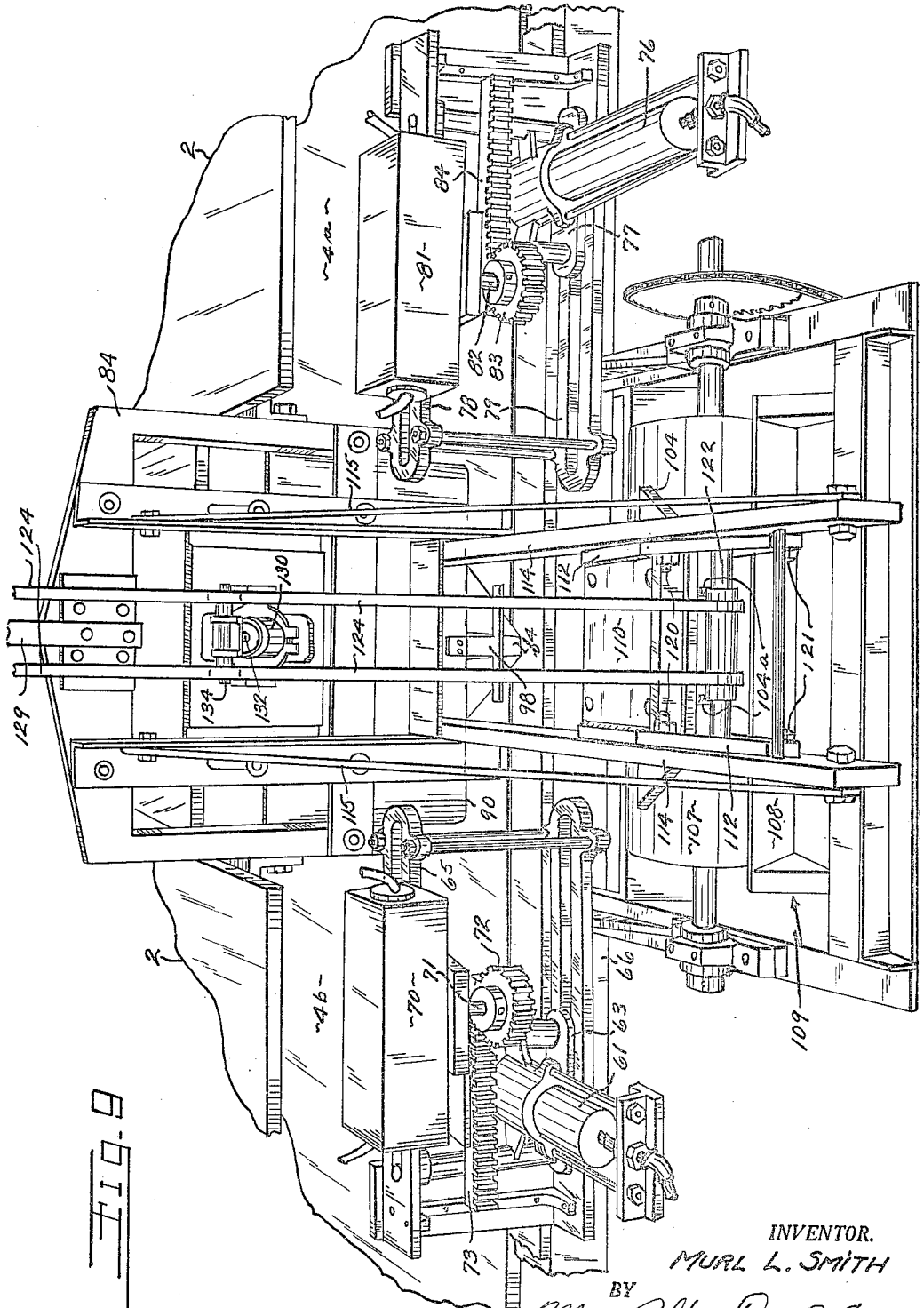
INVENTOR.
MURL L. SMITH
BY
Meyer Baldwin Doran & Egan
ATTORNEYS

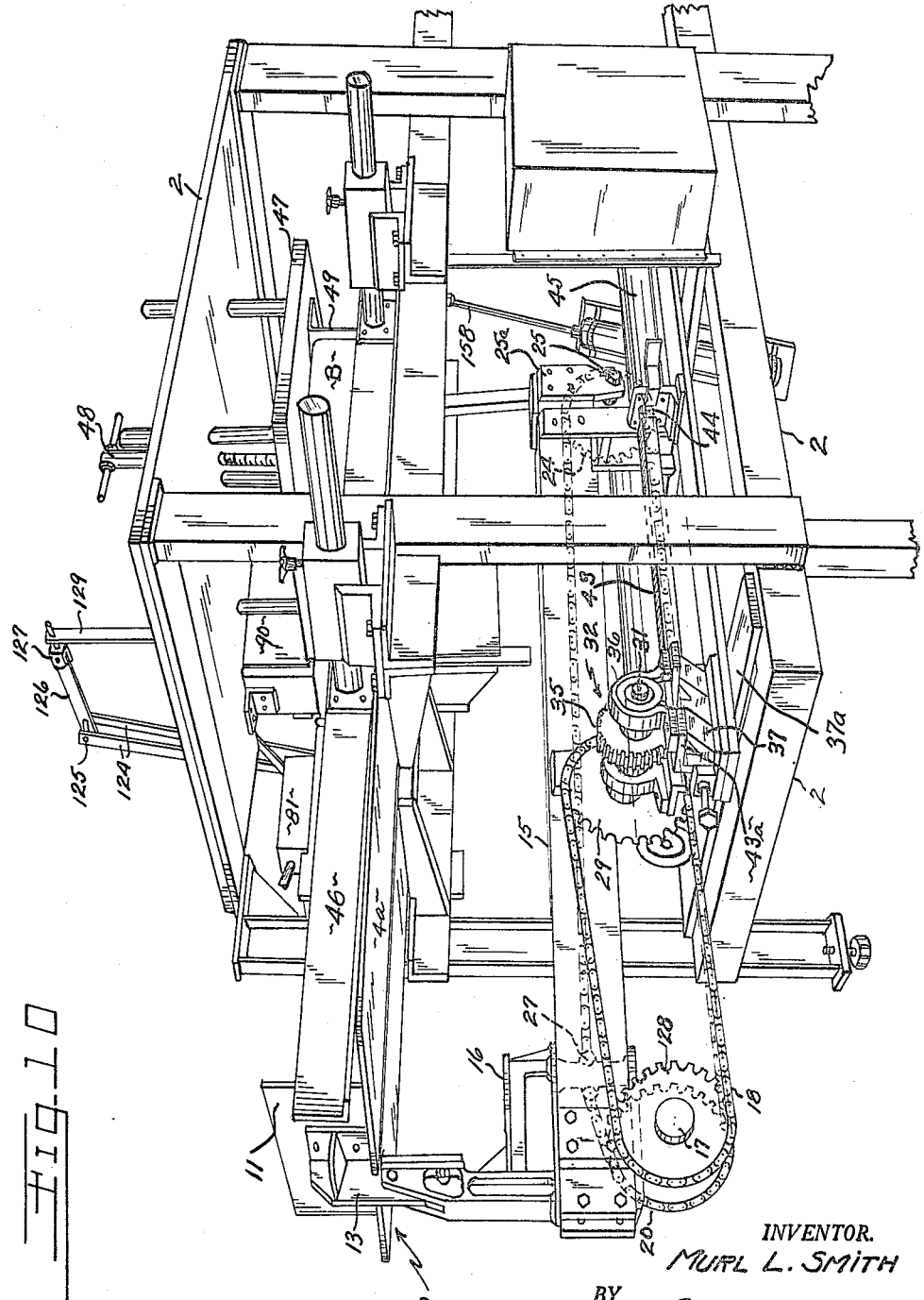

INVENTOR.
MURL L. SMITH

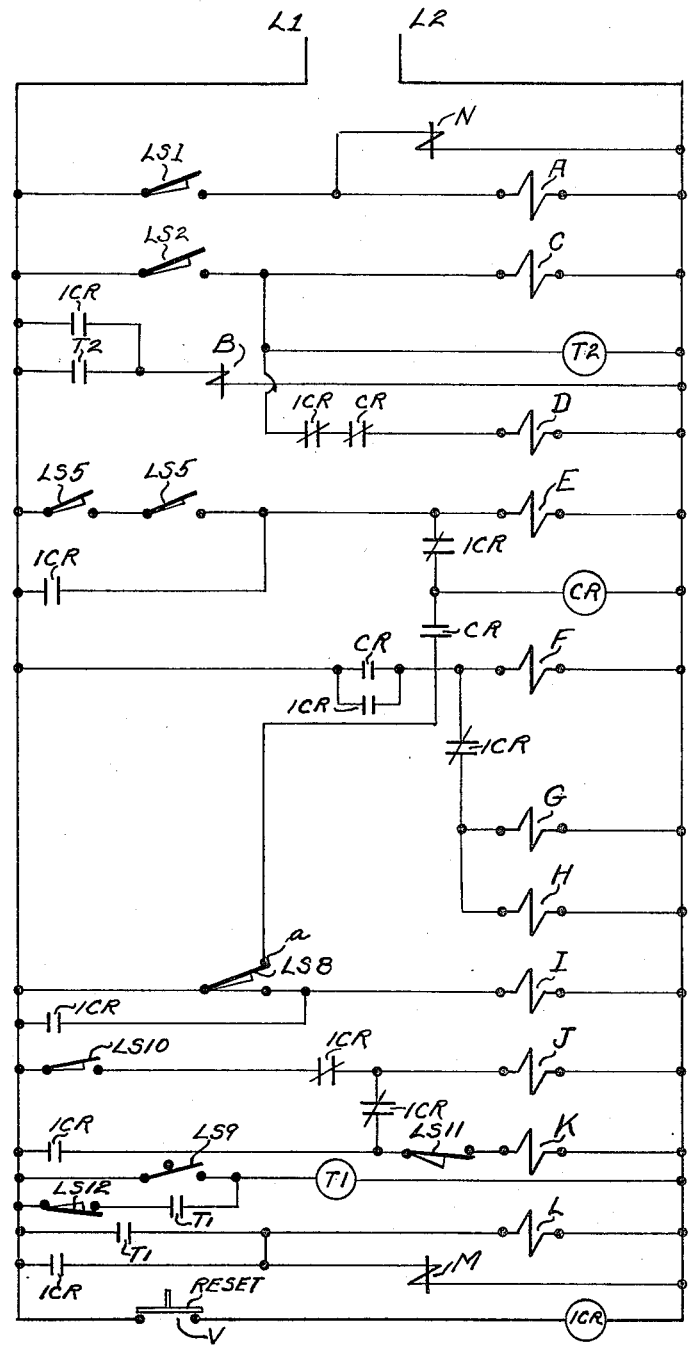

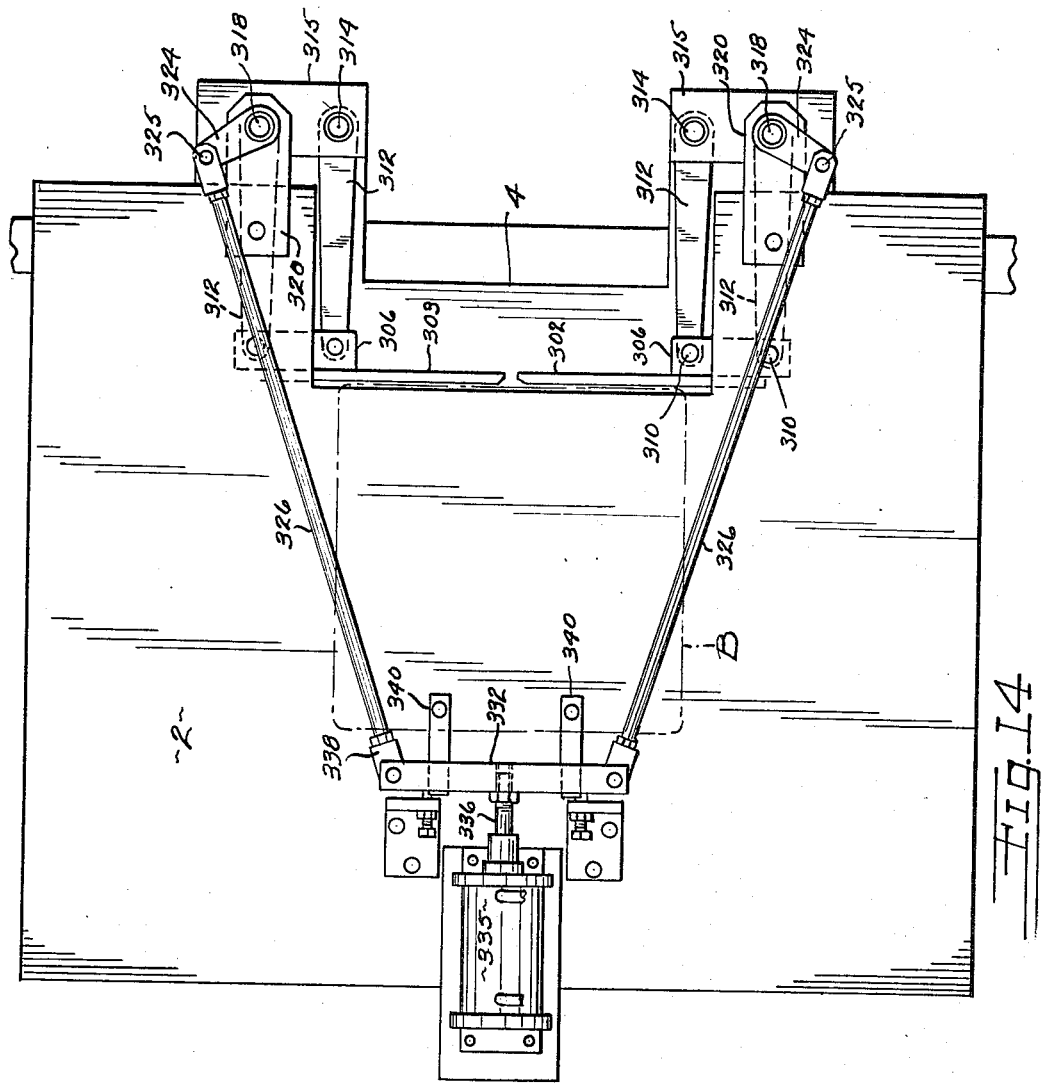

Nov. 29, 1966   M. L. SMITH   3,287,882
BALE CLOSING AND SEALING APPARATUS
Filed July 1, 1963   12 Sheets-Sheet 10
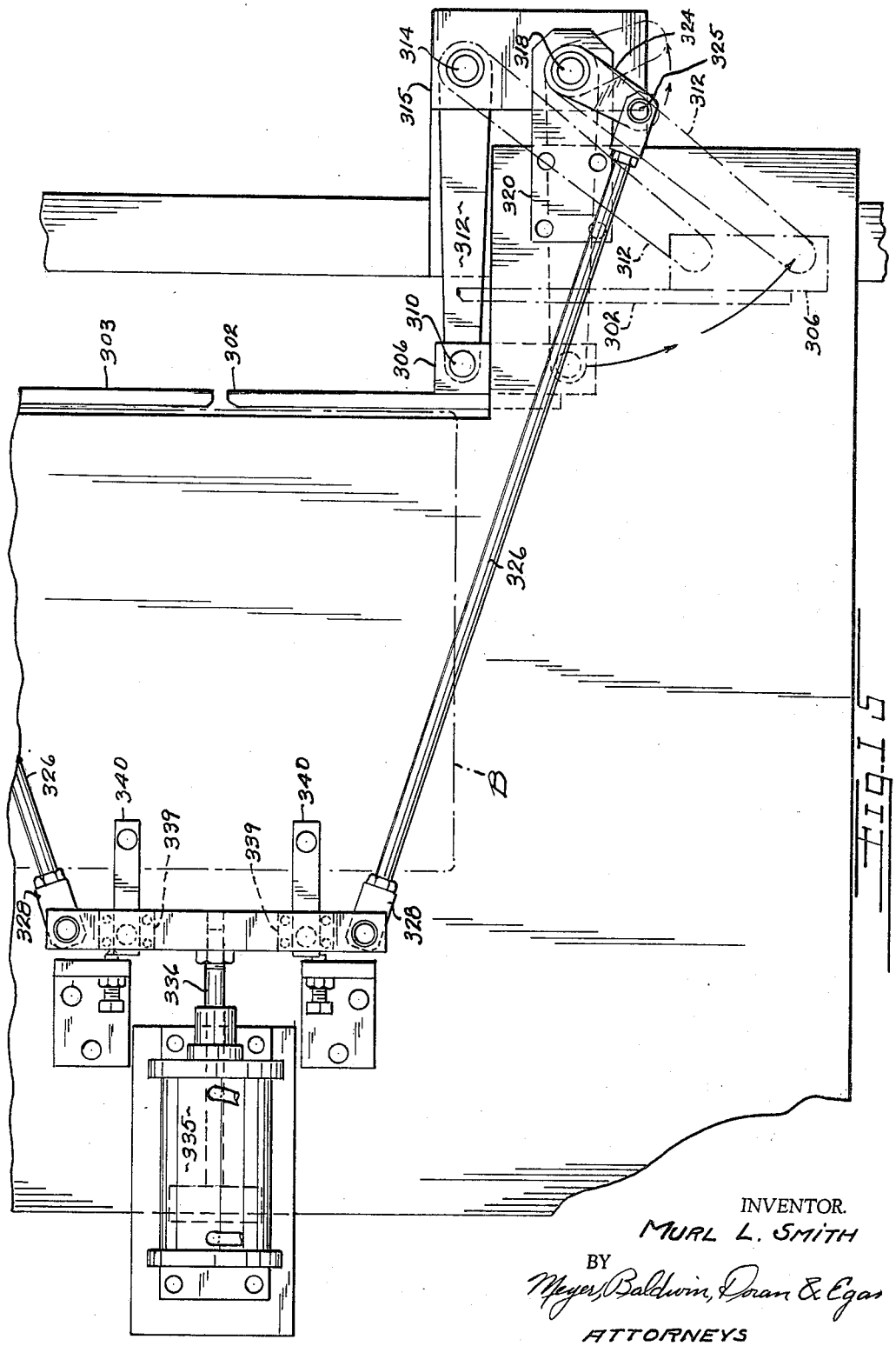
INVENTOR.
MURL L. SMITH
BY
Meyer, Baldwin, Doran & Egan
ATTORNEYS

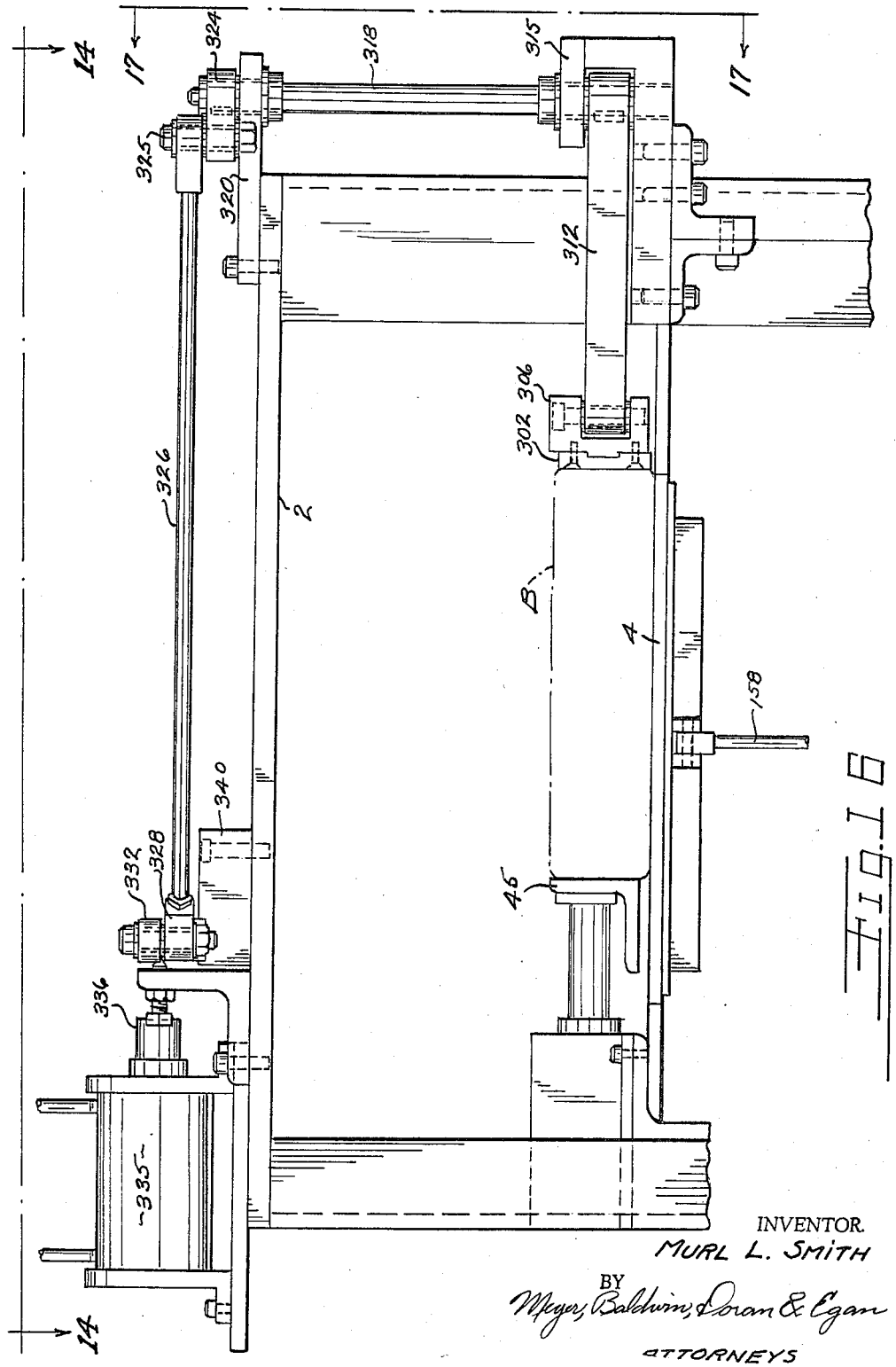

Nov. 29, 1966          M. L. SMITH          3,287,882
BALE CLOSING AND SEALING APPARATUS
Filed July 1, 1963          12 Sheets-Sheet 12
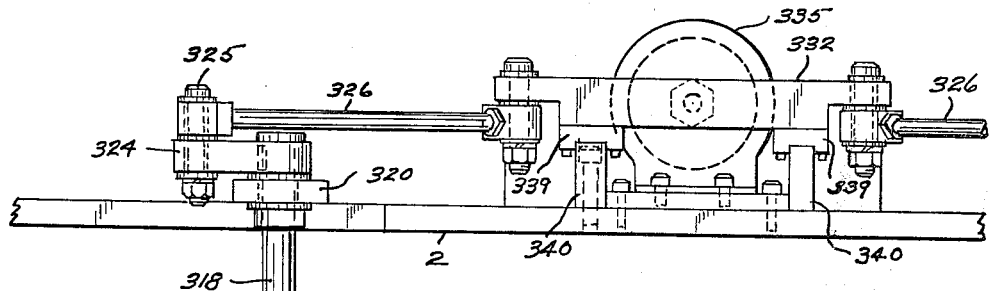
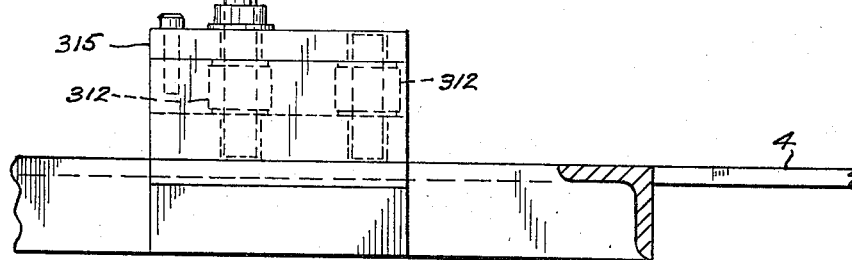
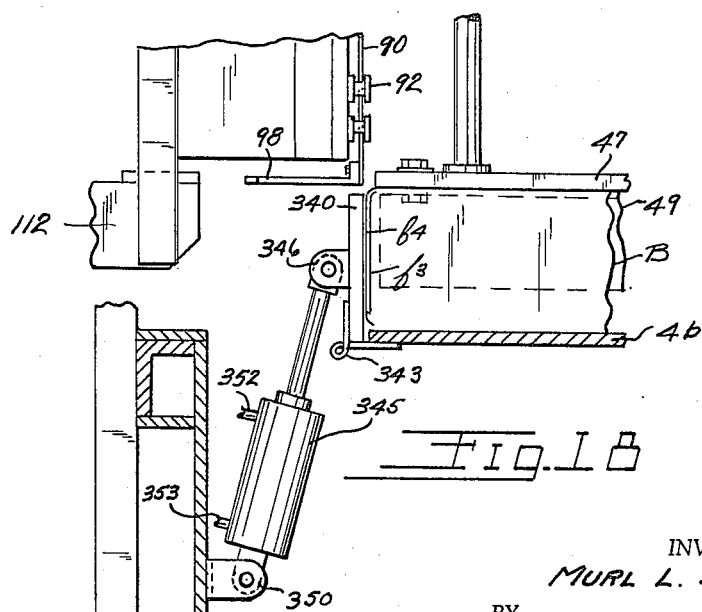
INVENTOR.
MURL L. SMITH
BY
ATTORNEYS

United States Patent Office 3,287,882
Patented Nov. 29, 1966

3,287,882
BALE CLOSING AND SEALING APPARATUS
Murl L. Smith, Parma Heights, Ohio, assignor to General Bay Equipment Corporation, Cleveland, Ohio, a corporation of Ohio
Filed July 1, 1963, Ser. No. 291,784
10 Claims. (Cl. 53—378)

This invention relates to new and improved baling apparatus and more particularly to apparatus especially designed for automatically closing and sealing a balelike container.

A primary object of the present invention is the provision of a new and novel baling apparatus especially designed to close and seal a balelike container and the like and wherein said apparatus is sequentially operable to convey an open-ended bale to a closing and sealing station, thence to automatically form a gusset-type closure and to thereafter seal said closure effective to close said one end, and subsequently operable to convey the sealed bale away from said machine station.

Another object of the present invention is to provide a new and improved baling apparatus especially designed to close and seal paper bales and like containers and wherein the bale is automatically and adhesively sealed.

Still another object of the present invention is to provide a new and improved baling apparatus especially designed to close and seal paper bales and like containers and which apparatus may be readily incorporated as an "in-line" component in an automated bale baling and sealing facility.

Other objects and advantages of the baling apparatus of the present invention will be apparent to one skilled in the art to which it pertains and upon reference to the following disclosure of a preferred embodiment thereof and which is illustrated in the accompanying drawings wherein:

FIGS. 2, 3, 4 and 5 are views similar to FIG. 1 but with the several bale closing and sealing components of the apparatus shown in the different positions occupied thereby during the operative cycle of said apparatus;

FIG. 6 is a fragmentary vertical section showing the adhesive applicator plate in its adhesive transfer position;

FIG. 7 is a fragmentary perspective view showing the T-bar on one closure plate in its retaining position with respect to the bottom closure fold on the bale;

FIG. 9 is an end perspective view of the hot melt unit and the closure fold forming devices in the instant apparatus;

FIG. 10 is a side perspective view of the apparatus;

FIG. 12 is a schematic wiring diagram of the electrical control circuit for use with the embodiment of bale closing and sealing apparatus;

FIG. 13 is a schematic diagram of the pressure fluid control circuit;

FIG. 14 is a plan view of a modified closure forming and folding device;

FIG. 15 is a plan view of the closure forming and folding device of FIG. 14 but with the same in a retracted position;

FIG. 16 is a front elevation of the device of FIG. 14;

FIG. 17 is a side elevation; and

Figure 1:
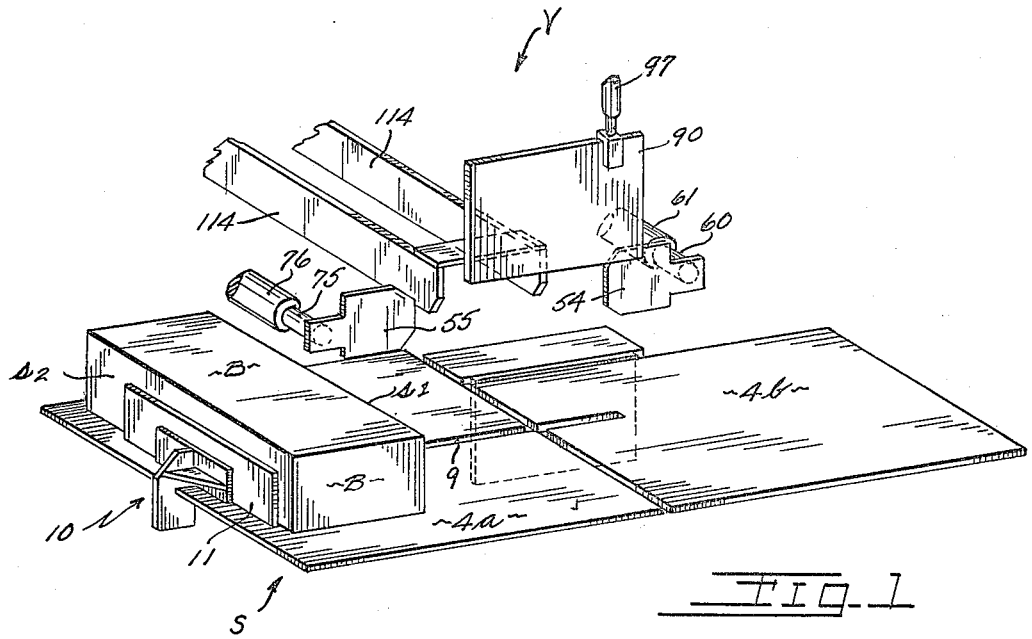
FIG. 1 is a fragmentary perspective view of a bale closing and sealing apparatus embodying the present invention.

Briefly, the bale closing and sealing apparatus of the present invention is especially designed to effect the closing and sealing of an open-ended bale in which previously has been disposed bulk products for example flour, sugar, coffee, etc. which are usually carried within smaller bags such as 10 pound bags and which are intended for subsequent retail distribution. The bale is intended to protect the smaller bags while the same are transported to their distribution outlet.

The instant bale and sealing apparatus may be functionally described as including conveying means operable to convey an open-ended bale to a bale closing and sealing station, closure forming means at said station which are operable to form a gusset-type closure on said open end and including applicator means for applying adhesive sealant to one of the gussets thus formed, said forming means also including means for closing said closure being thus effective to adhesively seal the bale; said bale being thereafter automatically conveyed to a disposal station for removal from said apparatus whereby the same is ready for a subsequent bale being presented thereto.

With reference now directed to the drawings, the bale closing and sealing apparatus of the present invention is seen to include a tablelike framework identified in its entirety by the reference numeral 2 and which has a rectangular platform or table preferably formed of two sections identified at 4a and 4b respectively and which are mounted end to end relation in an elevated horizontal position by legs 5. As will be explained hereinafter in greater detail, the platform section 4b is also intended to be swingable between its FIG. 1 and FIG. 11 positions.

The inlet or left end of the platform section 4a designated by the reference character S in FIG. 1, is intended to be located adjacent a suitable transfer conveyor capable of transporting a filled bale to the instant bale closing and sealing apparatus and depositing said bale on the table section 4a.

For example, the transfer conveyor mechanism may be of the type that is normally used with a baler machine such as is disclosed in United States Patent No. 2,613,021 issued on October 7, 1952 to Leslie H. Bowes and which conveyor mechanism with said baler machine enables the instant closing and sealing apparatus to be incorporated into a "in-line" packaging or baling system.

The open bales, one of which is identified in FIG. 1 by the reference character B, are each initially deposited on the inlet end S of the platform section 4a, and are thereafter individually conveyed along said platform to a gusset forming and bale sealing station indicated in its entirety by the reference character Y.

For this purpose, the platform sections 4a and 4b are each provided with a slot 9 extending preferably longitudinally centrally therealong and into which slot is disposed an upright paddle 10, said paddle having a pusher plate 11 extending upwardly above said platform and projecting partially transversely thereacross and thus in position to engage the side wall $s_2$ of the open-ended bale B.

As seen in FIG. 10, the paddle 10 includes an arm 13 which is attached to the pusher plate 11 at its upper end, said arm extending downwardly therefrom wherein its opposite end is disposed within a trackway 15 being connected therein with a dolly 16, the latter being movably carried within said trackway. The trackway 15 extends longitudinally along the aforementioned framework 2 below the platform, whereby the dolly 16 may be reciprocally moved therealong to move the paddle 10 to and fro of the aforesaid machine station Y.

To accomplish this a shaft 17 is journalled within a suitable bearing attached to the underside of trackway 15 at its one end and is seen to mount a sprocket 18 around which is reeved link chain 20. One end of said chain is connected to one end of the dolly 16 as at 21, said chain thence extending, as aforementioned, around sprocket 18, and longitudinally through the framework 2, around a second sprocket 24 similarly carried on shaft 25 rotatably mounted on the opposite end of the trackway 15, within brackets 25a, said chain thence connecting at its opposite end with the aforesaid dolly as at 27.

The shaft 17 is likewise seen to mount idler sprocket 28, said sprocket being disposed directly rearwardly of drive sprocket 29 mounted on the output shaft 31 of motion translation device identified in its entirety by the reference numeral 32, said sprockets 28 and 29 in addition, having endless drive link chain 33 extending therearound.

The motion translation device 32 may be of any conventional design capable of translating reciprocal motion into rotary motions and includes a pinion 35 which is likewise carried on shaft 31, the latter being rotatably journalled within bearings 36 mounted on a pedestal 37 seated, in turn, on cross beam 37a of the aforementioned framework 2.

Said device also includes a rack 43 which is slidably disposed in guide block 43a so as to be below and in mesh with the pinion 35, one end of rack 43 being attached to piston rod 44 of a double acting pressure fluid motor 45 mounted on framework 2. Said motor is intended to be reversibly actuatable to effect the reciprocation of the rack and hence the reversible rotation of the pinion 35 which, through the aforementioned sprocket and chain drive will effect to slide the paddle 10 to and fro of the machine station Y.

Figure 2:
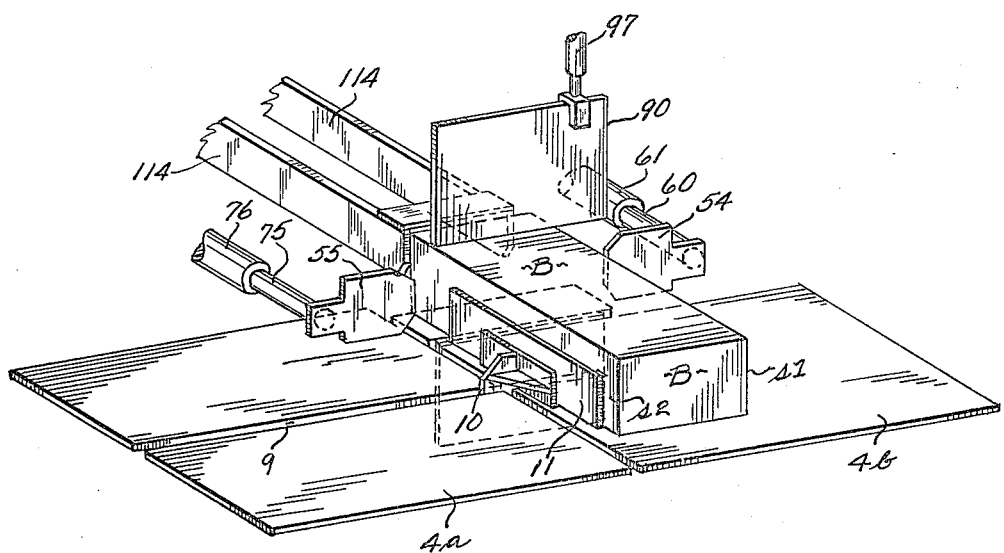

In this manner, a bale B deposited at the inlet end S of the platform in front of the paddle 10 may be slidably moved therealong to the right as viewed in FIG. 2 and positioned at said machine station Y and thereafter the paddle may be returned to its initial position adjacent said inlet end to await a subsequent bale being placed thereon.

As best seen in FIG. 2, the forwardmost position taken by the paddle 10 in its bale feeding stroke is such as to locate the bale B on platform section 4b with its open end directly opposite and facing the gusset forming and sealing apparatus at said station Y.

An upright rail 46, as shown in FIG. 10, adjustably mounted on each of the platform sections adjacent one longitudinal edge is engageable with the closed end of the bale and is thus operable to guide said bale as it is moved therealong to said machine station.

In moving to said station, the bale passes underneath a header plate 47 as best seen in FIG. 10 which is seen to be rectangular in its instant configuration and which is suspended above the platform, in substantial parallel spaced relation to the same, being adjustable toward and away from the upper surface thereof by means of lead screw 48 to a plurality of spaced positions thereabove, being thus disposed as to accommodate a plurality of sizes of bale between the same and said platform.

End plate 49 mounted on the front edge of the header plate 47 depends downwardly therefrom so as to extend transversely across the platform and is positioned to intercept the front end wall of the bale as it is moved to the aforesaid station Y, said header plate 47, rail 45, end plate 49 and paddle 10 being operative to engage the adjacent sides of the bale so as to maintain its box-like configuration during its conveyance to said station.

Figure 3:
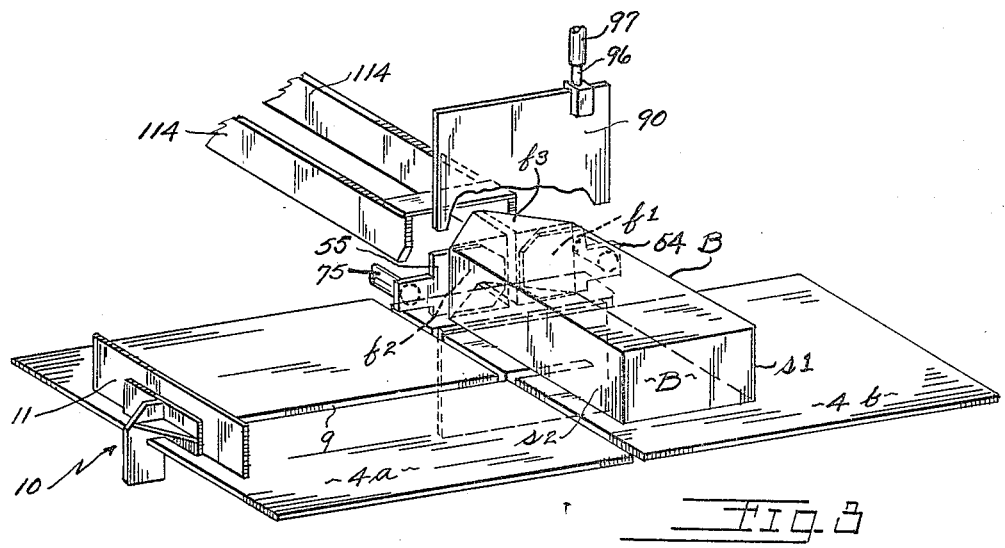

With the bale disposed at said station Y, the bale closing and sealing apparatus is first actuatable to form a closure on said open end and for this purpose, a pair of plows as identified at 54 and 55 in FIGS. 1 and 2 are adapted to be movable transversely over the platform and into the path of conveyance of the bale to a position adjacent the forward and rear vertical side walls $s_1$ and $s_2$ of the bale B, said plows being thereafter actuatable toward each other and effective thereby to fold the end of each of said side walls into a gusset shaped fold as identified in FIGS. 3 and 7 at folds $f_1$ and $f_2$.

To accomplish this and as may be best seen in FIGS. 2 and 9, each of the plows 54 and 55 is disposed in an upright position so as to extend substantially vertically upwardly above the top face of the platform.

The plow 54 hereinafter also referred to as the forward plow is attached to the end of piston rod 60 of double acting pressure fluid motor 61, said motor, in turn, being carried on a carriage 63 which is slidably supported between upper and lower rail members 65 and 66 attached to the framework 2 so as to be adjacent bale side wall $s_1$.

The carriage 63 also mounts a rack element 73, the latter extending longitudinally therealong so as to be in substantial parallel spaced relation with the platform.

A conventional pressure fluid actuated motion translation device as indicated in its entirety by the reference 70 which is operable translate reciprocal motion to rotatable motion of corresponding direction is mounted on said rail member 65 and has a rotatable output shaft 71 which mounts a pinion 72, the latter meshing with the rack element 68.

In like manner, plow 55, also referred to herein as the rearward plow is similarly mounted in a vertical position above the platform on the end of piston rod 75 of double acting pressure fluid motor 76, the latter being carried on carriage 77. The carriage 77 is seen to be slidably supported between rail members 78 and 79 likewise mounted one above the other on the framework 2, said carriage being spaced rearwardly along said platform from carriage 63 so as to be positioned adjacent the bale side wall $s_2$ with said bale deposited at station Y.

Motion translation device 81 similar to translation device 70 is mounted on rail member 78, and has a rotatable output shaft 82 mounting pinion 83 which, in turn, meshes with a rack element 84 mounted on the carriage 77. Said motion translation device 81 is likewise reversibly actuatable to reciprocally move the carriage 77 along its supporting rails.

From their respective retracted positions as shown in FIGS. 1 and 9, the pressure fluid motors 61 and 76 are actuated whereby the forward and rearward plows 54, 55 are first propelled inwardly and transversely over the platform into the conveyance path to the position shown in FIG. 2 so as to be disposed on either side of the bale B and adjacent the open end thereof. The translation devices 70 and 81 are then actuated so as to propel the rack element 73 to the right as viewed in FIG. 9 and the rack element 84 to the left effective to move the plows 54 and 55 toward each other and into engagement with the forward and rearward side walls $s_1$, $s_2$ of the bale to the FIG. 3 position therefor, effective to form the gusset-shaped folds $f_1$ and $f_2$ thereon.

Subsequently thereto, the motion translation devices 70 and 81 are reversibly actuated so as to withdraw each of the plows away from the bale, and the motors 61 and 76 are likewise reversibly actuated effective to retract the piston rods 60 and 75 therefor and hence return said plows 54, 55 to their retracted FIG. 1 position.

The actuation of said plows is preferably simultaneous, however, each plow, if desired, may be individually cyclically operated in the above manner.

As seen in FIG. 3, the formation of the side folds $f_1$ and $f_2$ by said plow members also form the top and bottom folds $f_3$ and $f_4$ respectively of the gusset-type closure.

The bale closing and sealing apparatus is next operable to move the top fold $f_3$ to its closed position over the side folds $f_1$, $f_2$.

Figure 8:
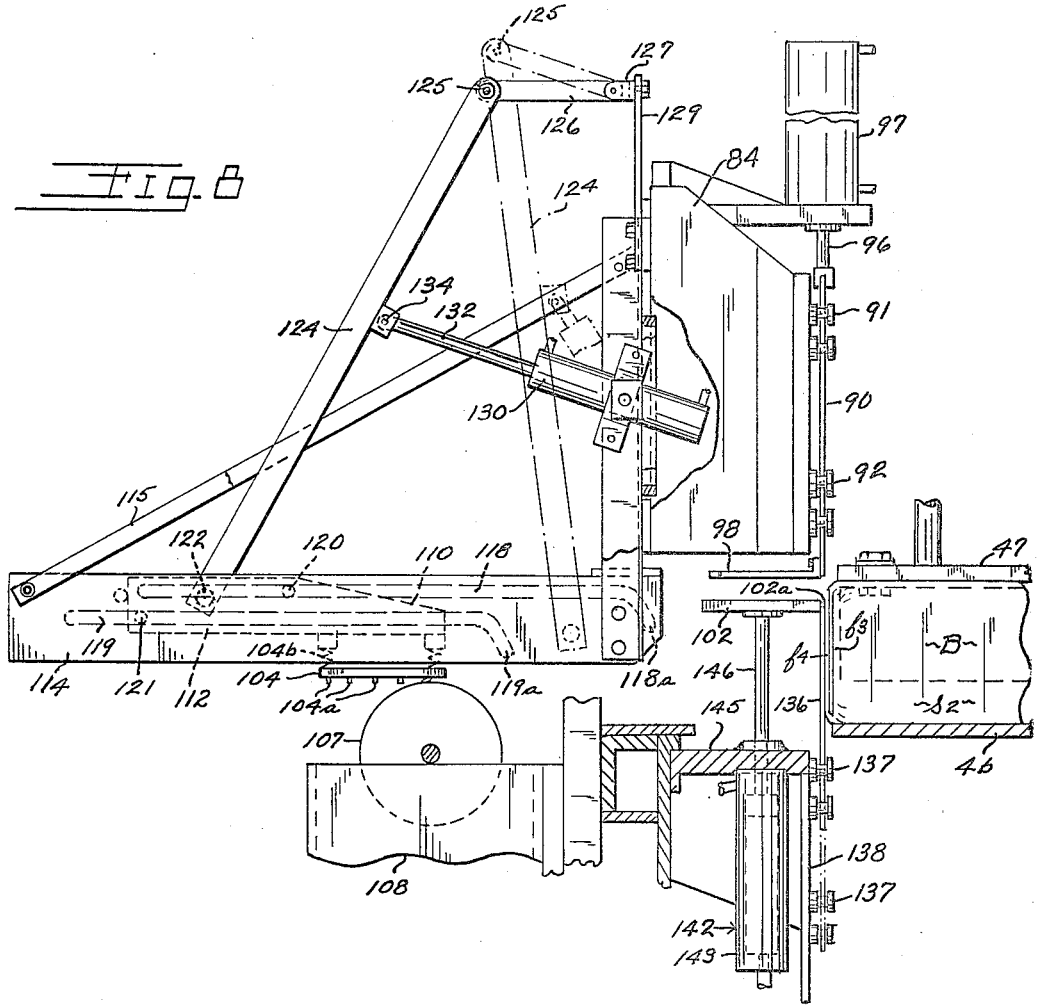
FIG. 8 is a side elevation of the apparatus showing the adhesive hot melt unit attached to the machine framework.

To accomplish this, a blade member 90 as best seen in FIG. 8 is slidably mounted within spaced rows of rollers 91 and 92 carried on the opposed vertical sides of housing 84 which, in turn, is mounted on framework 2 above the platform so as to position said blade member 90 directly above the top fold $f_3$. As seen in FIG. 3, the blade member member 90 is in its retracted position whereby the bottom edge thereof is spaced above said top fold.

Figure 4:
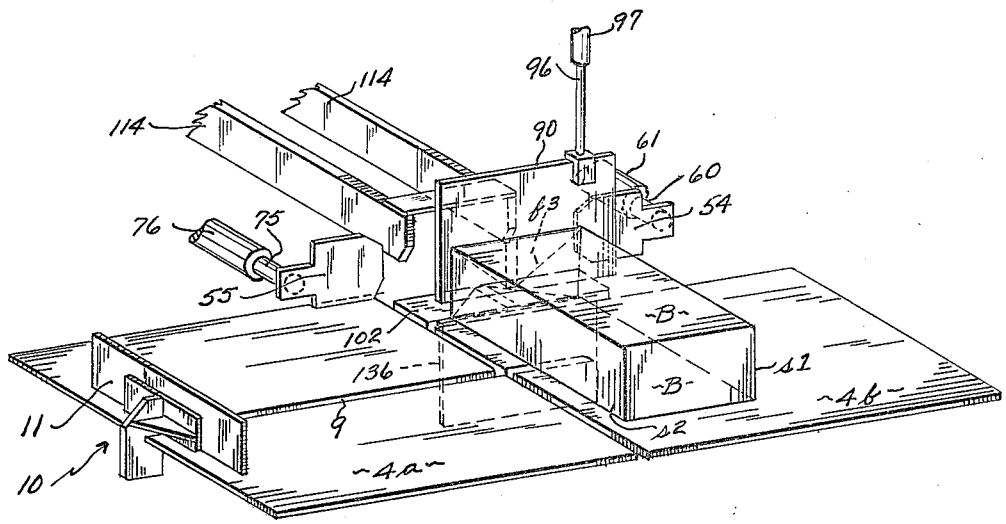

The piston rod 96 of a conventional double acting pressure fluid motor 97 carried on housing 84 is attached to the upper edge of the blade member 90, whereby upon energization of said motor, said blade member 90 may be propelled downwardly to its FIG. 4 position effective to wrap or wipe the top closure fold $f_3$ downwardly and over the previously formed side folds $f_1$ and $f_2$.

As the blade member 90 is moved to its lowered position it is preferably retained in said position for a predetermined period during which interval a T-shaped hold bar as identified at 98 in FIGS. 6 and 7, and which is mounted on the rear face 90a of said blade member, engages the upper surface of the bottom closure fold $f_4$ so as to press the same to a somewhat flat condition against an elevatable plate 102 whereby it is in position to have adhesive applied thereon in the manner as will now be described.

As seen in FIGS. 8 and 9, an adhesive applicator which, in the instant assembly, takes the form of a flat plate 104, is positionable between a suitable adhesive hot melt unit 109 and the aforesaid bottom fold $f_4$ of the bale B.

The applicator plate 104 is suspended from the underside of a carriage plate 110, the latter being mounted on a pair of spaced arms 112 and extending therebetween. Said arms 112 are slidably mounted within a pair of grooved trackways formed on the inner faces of spaced rails 114 attached at one end to the side of the framework 2 and extending outwardly therefrom at said machine station Y, said rails projecting over the aforesaid hot melt unit 109 and suspended in said position by brace members 115.

Each trackway comprises an upper and lower trackway, 118, 119, respectively, extending in parallel spaced relation to each other longitudinally along the inner vertical face of each rail, each of the aforesaid arms 112 mounting a roller 120 on its forward end which is accommodated in the upper groove 118, and a roller 121 adjacent its rearward end and which is accommodated within the lower groove 119.

As best seen in FIG. 8, the upper trackway 118 in each rail is provided with a downwardly and relatively forwardly projecting portion 118a at its forward end adjacent the platform, the lower trackway 119 likewise being provided with a similarly downwardly angulated and forwardly projecting groove portion 119a the latter terminating along each rail 114 outwardly of groove portion 118a.

As aforementioned, the adhesive transfer device is slidably movable along the trackways between the position therefor as shown in solid lines in FIG. 8 and the position shown in FIG. 6 whereby as it moves along said trackway and approaches said FIG. 6 position, the upper rollers 120 and lower rollers 121 move along trackways 118 and 119 and into the angular portions 118a and 119a, respectively.

The underside of the applicator plate 104 is preferably provided with a plurality of spaced lugs or pins 104a attached thereto in a predetermined pattern which lightly engage and wipe across the adhesive transfer roll 107 of said unit 109 whereby adhesive is deposited onto said lugs.

The adhesive application plate 104 is moved forwardly toward the machine framework and over the closure fold $f_4$ and then downwardly toward said fold $f_4$ to bring the lugs 104a into adhesive transfer relation with the top surface of said fold $f_4$ effective thereby to apply adhesive to the same in a predetermined pattern.

The plate 104 is preferably movably suspended from the carriage plate 110 so as to permit limited vertical movement thereto as said plate lugs 104a engage the roll 107. Suitable springs 104b disposed between said carriage plate and applicator plate bias the latter from the former. As best seen in FIG. 8, the roll 107 is partially immersed in an adhesive bath carried in tank 108.

To provide for the reciprocal movement of the adhesive transfer plate 104 in the manner as is just described, a rod 122 is seen in FIGS. 8 and 9 to be suspended between the rearward ends of the arms 112. A pair of arms 124 are journalled adjacent the ends of said rod, the opposite ends thereof each being pivotally attached at 125 to one end of a leaf member 126, the latter being, in turn, pivotally attached at its opposite end to anchor 127 mounted on plate 129 carried on housing 84.

Arms 124 and leaf members 126 thus form a scissorlike suspension about pivotal connections 122, 125 and 127. A double acting pressure fluid motor 130 has its cylinder pivotally attached at 131 to the framework 2 and its piston rod 132 pivotally attached at 134 to the arms 124 intermediate the ends thereof.

With this assembly, the motor 130 may be actuated to swing the arms 124 about pivots 125 and 127 in a counterclockwise direction from its solid line position to its dotted line position as seen in FIG. 8 effective to slidably move the adhesive transfer plate 104 and supporting carriage toward the platform to its FIG. 6 position whereby, as above described, a suitable pattern of adhesive is applied to the upper surface of the bottom closure fold $f_4$ of the bale B.

In its movement toward the platform, the carriage plate 110 slides between the grooved trackways in approximately a horizontal plane until the rollers 120 and 121 move into the downwardly inclined trackway portions 118a, 119a of said trackways, and thence said plate gravitationally slides down said inclined trackway portions to carry the adhesive transfer plate 104 into engagement with the aforesaid closure fold $f_4$. As seen in FIG. 8, the inclination of each trackway portion 118a, 119a is preferably identical so that as the plate 104 moves therealong it is retained in its approximate horizontal plane.

A reversible actuation of motor 130 will effect to return the adhesive transfer device to its retracted FIG. 8 position. During said return actuation, the carriage plate 110 is slid upwardly along the aforesaid incline trackway portions 118a, 119a and then rearwardly along said trackways to said retracted position.

Subsequent to the application of the adhesive to the upper surface of the bottom closure fold $f_4$ of the bale B, said fold is then swung upwardly, over and against the top fold $f_3$ whereat the same is adhesively secured to the latter and said side folds $f_1$, $f_2$ being thus effective to seal said bale.

To accomplish this, and with particular reference to FIGS. 6 and 8, the aforementioned elevatable plate 102 is seen to be attached to the upper edge of a closure plate 136.

The closure plate 136 is slidably carried between vertically spaced pairs of rollers 137 mounted on plate 138 attached to the framework 2 below the platform so as to locate said closure plate at the juncture of the bottom closure fold $f_4$ and the bottom wall of the bale B.

The closure plate 136 is attached at its upper edge to the longitudinal side 102a of the elevatable plate 102 so as to hang vertically downwardly therefrom.

The plate 102 is reciprocally positionable as to locate its upper surface in substantial planar relation with the upper surface of the platform 4a, 4b as seen in FIG. 6 so as to present a continuous surface to the bale as it is moved thereon and to the closing and sealing station Y.

From this position the plate 102 is elevatable to its FIG. 8 position effective to carry the closure plate 136 upwardly and into wiping engagement with the bottom closure fold $f_4$ whereby the latter is folded over and across the previously closed closure folds $f_1$–$f_3$ to seal the bale.

To provide for this reciprocal movement for plate 102, a suitable double acting pressure fluid motor 142 has its cylinder 143 attached by bracket 145 to the framework 2 below the platform and its piston rod 146 secured to the underside of plate 102. Upon actuation of motor 142, plate 102 and closure plate 136 are reciprocally moved to fold the aforesaid bottom closure fold $f_4$ to its sealed position and thence returned to its retracted position as shown in FIG. 6.

After the bale is sealed, it is then removed from the closing and sealing station Y so that the next bale to be sealed may be moved to said station.

Figure 11:
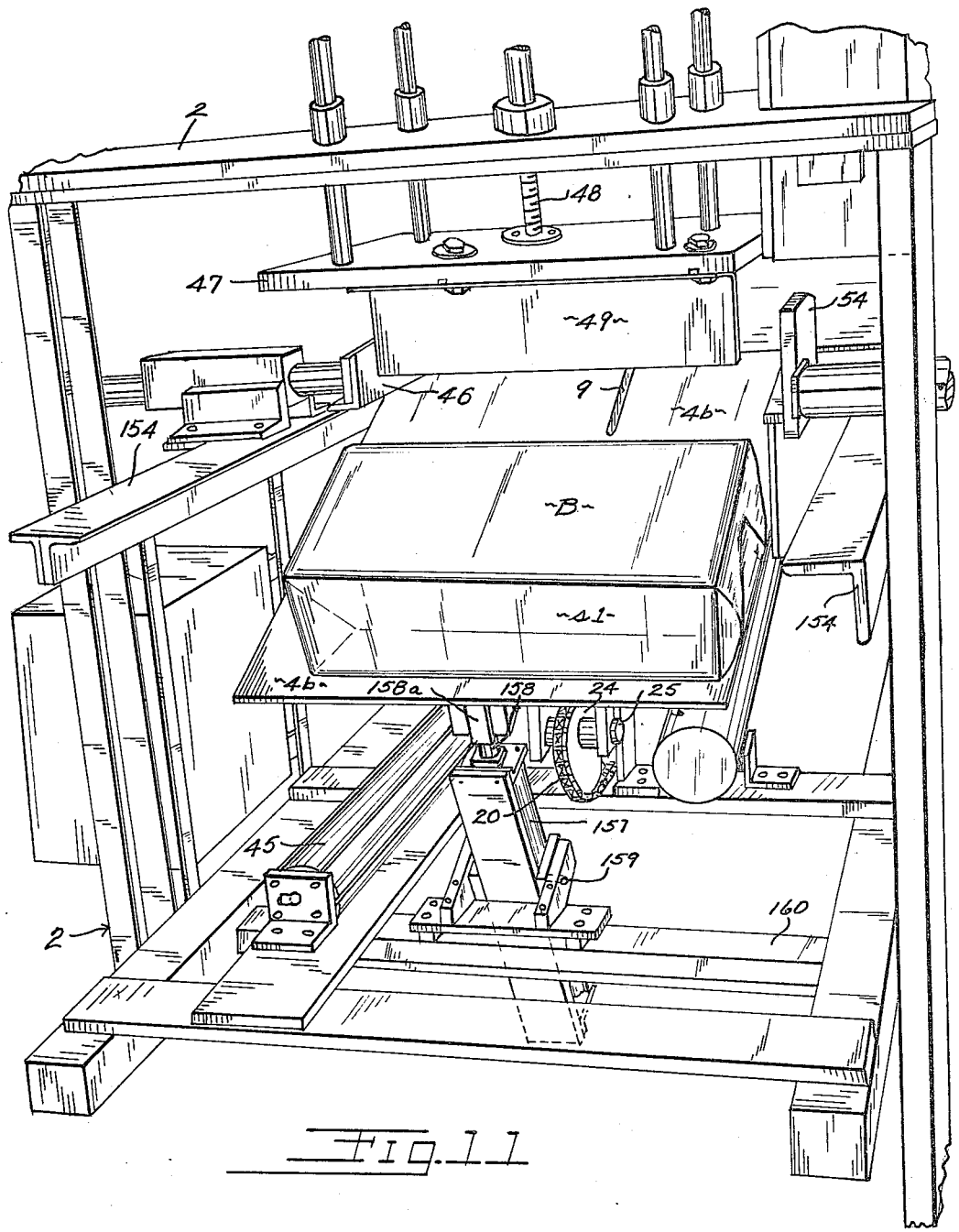
FIG. 11 is an end perspective view of the apparatus showing the bale discharge station.

For this purpose, as best seen in FIG. 11, the section 4b of the platform is seen to be hingeably mounted at its rearward end to spaced rails 154 which form a part of the machine framework 2.

A suitable double acting pressure fluid motor 157 has its piston rod 158 pivotally attached at 158a to the end of said platform section 4b opposite said hingeable connection, the cylinder of said motor being suitably pivotally attached at 159 to a framework crossrail 160.

The motor 157 is intended to be actuatable so as to swing the platform section 4b downwardly to its FIG. 11 position whereby it is at such inclination that the sealed bale will begin to slide gravitationally downwardly therealong and will gain sufficient momentum to slide onto a suitable discharge conveyor, not shown. In this manner, the sealed bale B is removed from the platform section 4b and the motor 157 may then be reversibly actuated to raise said platform section upwardly to thereby position the same to receive the next bale.

As mentioned hereinabove, the operation of the several bale closing and sealing components are preferably automatically controlled.

One such type of machine control is shown in FIG. 12 and comprises generally an electrical control system which is operable to cyclically control a suitable pressure fluid system as shown in FIG. 13 such as a hydraulic or pressurized air system effective to operate the several machine components previously described.

With reference now directed to FIG. 12, a schematic wiring diagram is herein shown embodying an electrical control system which includes primary power lines $L_1$ and $L_2$ which are intended to connect said system to a suitable source of supply voltage, not herein shown, such as for example a 110 A.C. volt source.

To perform the first operation of the instant baling apparatus, that is, the actuation of paddle 10 to slide the open ended bale B to the machine station Y, a limit switch identified as LS1 in FIG. 12 is seen to be connected between the power line $L_1$ and one end of the coil for solenoid A, the opposite end of said coil being connected to power line $L_2$.

As herein shown, the limit switch LS1 is in its normally open position.

This limit switch is conveniently placed on the machine framework so as to be actuated to its closed position by the conveyance means which places the open ended bale B onto the inlet end S of the platform section 4a.

As seen in FIG. 13, the solenoid A is connected into the pressure fluid system so as to be connected between the supply conduit R and through conduit 45a to one end of the fluid motor 45.

When the coil for the solenoid A is energized it connects the fluid motor 45 to the supply conduit R which is effective to propel the paddle 10 from its FIG. 1 to its FIG. 2 position so as to push the open ended bale B to the machine station Y.

Limit switch LS2, as shown in its normally open condition in FIG. 12, is connectable between power line $L_1$ and one end of the coil for solenoid C, the opposite end of said coil being connected to power line $L_2$.

The limit switch LS2 is located on the machine framework 2 so as to be actuated by the paddle 10 as it moves to its FIG. 2 position whereat said limit switch is closed energizing the coil of solenoid C.

The coil of timer T2 is likewise seen to be connected in parallel across the coil of solenoid C so as to be energized with the latter as the limit switch LS2 is moved to its closed position by paddle 10.

The timer is seen to have a normally open contact T2 connected between the power line $L_1$ and one end of the coil of solenoid B, the opposite end of said coil being connected to power line $L_2$.

With this circuitry, it will now be seen that when the switch LS2 is closed by paddle 10 so as to energize solenoid C and timer T2, the following will take place.

Referring to FIG. 13, solenoid C is effective to connect one end of each of the hydraulic motors 61 and 76 through conduits 61a and 76a respectively, connected in parallel between said motors to the supply conduit R whereby the forward and rearward plows 54 and 55 respectively are moved from their FIG. 1 to their FIG. 2 position into the conveyance path for the bale B so as to be closely adjacent the side walls $s_1$ and $s_2$ of said bale.

When the limit switch LS2 is closed by the paddle 10, the coil of solenoid D is likewise connected to power line $L_1$ through the normally closed contact 1CR of relay 1CR and normally closed contact CR of relay CR, the latter being connected in series between said power line $L_1$ and limit switch LS2 and the coil of solenoid D.

When this occurs, the solenoid is actuated so as to connect each of the motion translation devices 70 and 81 through conduits 70a and 81a respectively connected in parallel, to the supply conduit R whereby the carriages 63 and 77 are moved toward each other so as to carry the plows 54 and 55 from their FIG. 2 to the FIG. 3 position whereby the closure folds $f_1$ and $f_2$ are formed on the open end of the bale B.

The coil of solenoid E is seen to be connected in series with a pair of limit switches identified as LS5 between power lines $L_1$ and $L_2$, each limit switch LS5 being shown herein in its normally open position.

Each of said limit switches is positioned so as to be engageable by one of the plows 54, 55 as the same are moved to their FIG. 3 position whereby they are actuated to a closed position.

When this occurs the coil of solenoid E is connected across power lines $L_1$ and $L_2$ and energized to connect the opposite end of translation devices 70 and 81 through conduits 70b and 81b connected in parallel so as to return the plow carriages 63 and 77 to their FIG. 4 position.

The timer T2 awaits the movement of the forward and rearward plows and then its normally open contact T2 closes to connect the coil of solenoid B across power lines $L_1$ and $L_2$.

When this occurs, the pressure fluid motor 45 is reversibly connected through conduit 45b to the supply conduit R through said solenoid B so as to reversibly actuate said motor and return the paddle 10 to its FIG. 1 position to await the next open ended bale to be placed on the inlet end of the platform section 4a.

As the paddle 10 is returned the limit switch LS2 automatically returns to its normally open position.

The coil of relay CR is also connected across solenoid E through a normally closed contact 1CR of relay 1CR, said CR coil likewise being connected to one of its normally open contacts CR and from the latter to the normally closed contact "a" of limit switch LS8, the movable actuating arm $s$ of said limit switch connecting to power lead $L_1$.

With this circuitry, when the limit switches LS5 are closed by the movement of the plows 54, 55 to their FIG. 3 position, the relay coil of CR is energized whereby its normally open contact CR is closed thus locking said coil CR in its energized condition through the limit switch LS8.

The coil of solenoid F is seen to be connected in series with a second normally open contact of relay CR across the power leads $L_1$ and $L_2$ and upon the energization of the relay CR said second normally open contact thereof closes to energize the coil of solenoid F.

When this occurs, the opposite end of the motors 61 and 76 are connected through conduits 61b and 76b connected in parallel to the solenoid F so as to reversibly actuate said motors and return the plows 54 and 55 to their retracted FIG. 1 position.

The energization of relay CR is also effective to energize the coils of solenoids G and H.

The energization of solenoid G, as seen in FIG. 13, is effective to connect one end of the hydraulic motor 97 through its conduit 97a to the supply conduit R whereby said motor is actuated to propel the top plate 90 downwardly and fold or wrap the top closure fold $f_3$ over the previously closed folds $f_1$ and $f_2$.

At the same time, the coil of solenoid H is energized so as to connect one end of hydraulic motor 130 through its conduit 130a to the aforementioned supply conduit R effective to move the adhesive applicator carriage and plate 104 along the trackways 118 and 119 and bring the adhesive applicator plate 104 into adhesive transfer relation with the bottom fold $f_4$.

The preferred velocity of the motor 97 is somewhat faster than the speed of motor 130 so that the top fold $f_3$ is closed and the T-bar mounted on the rear face 90a of the top plate 90 is in engagement with the top surface of the bottom fold $f_4$ prior to the adhesive applicator plate 104 being moved to its adhesive transfer position with respect to the latter.

Limit switch LS8 is located on the framework 2 so as to be engageable by the adhesive applicator plate as the latter moves to its FIG. 6 position and into adhesive transfer relation with the top surface of the bottom fold $f_4$ whereby the switch arm s moves to its "b" position.

When this occurs, the coil of solenoid I is energized to connect the opposite end of the hydraulic motor 130 through its conduit 130b to the aforementioned supply conduit R and reversibly actuate said motor to return the adhesive carriage and applicator plate 104 to its retracted position as is shown in solid lines in FIG. 8.

The limit switch LS10 is positioned on the framework 2 so as to be engaged by the applicator carriage 110 as it begins its retractable movement, said switch being actuated to its closed position so as to energize the coil of solenoid J.

As seen in FIG. 13, the energization of solenoid J connects one end of the motor 142 through its conduit 142a to the hydraulic source whereby said motor is actuated and effective to raise the closure plate 102 upwardly above the platform section 4b whereby it wipes and/or wraps the bottom fold $f_4$ over and into closed position with the previously formed closure folds $f_1$–$f_3$, such that the adhesive previously disposed thereon seals said flaps together and hence closes or seals the bale.

When the limit switch LS10 is moved to its closed position, the coil of solenoid K is also energized and is effective to connect the opposite end of the motor 97 through its conduit 97b to the supply conduit R whereby the closure plate 90 is raised upwardly from its FIG. 4 to its FIG. 3 position.

Limit switch LS9 is mounted on the framework 2 so as to be actuated by the plate 90 as it moves to its FIG. 4 position, effective to energize the coil of timer T1, said timer being locked in its energized condition across the power lines $L_1$, $L_2$ through one of its normally open contacts T1 connected between the timer coil and one side of normally closed limit switch LS12, the opposite end of the latter connecting to the power line $L_1$.

A second normally open contact T1 of the timer T1 is likewise closed upon energization of the timer coil so as to connect the coil of solenoid L across the power lines $L_1$ and $L_2$ and as seen in FIG. 13, this solenoid is effective to connect the opposite end of the pressure fluid motor 142 through its conduit 142b to the supply conduit R whereby said motor is reversibly actuated to return or retract the closure plate 136 to its FIG. 6 position.

The coil of solenoid M is connected across the coil of solenoid L and is energized with the latter whereby the pressure fluid motor 157 is connected through its conduit 157a to the aforementioned supply conduit R being thus actuated to swing the platform section 4b to its FIG. 11 position whereby the sealed bale B gravitationally slides down the same and onto the conveyor 165 for removal from the instant framework.

Subsequently, when the next bale B is deposited on the platform section 4a, the limit switch LS1 is re-closed to energize the coil of solenoid A and begin the next subsequent bale sealing and closing operation.

As seen in FIG. 12, the coil of solenoid N is connected in parallel across the coil of solenoid A so as to be energized with the same. When this occurs, the opposite end of the hydraulic motor 157 is connected through its conduit 157b to the aforementioned supply conduit R which is effective to reversibly actuate the motor and swing the platform section 4b from its FIG. 11 position and return the same to its FIG. 1 position.

As seen in FIG. 12, the coil of reset relay 1CR is connected across the power leads $L_1$ and $L_2$ through a normally open, manually operable reset button V. When the reset button V is depressed to its closed position energizing the coil of relay 1CR the normally open contacts of this relay connected in controlling relation with the several bale closing and sealing components of the instant apparatus are each actuated to return each of said components to their "rest" position. Specifically, a normally open contact 1CR connects the coil of solenoid B across the power lines $L_1$ and $L_2$ and when closed to energize said solenoid the paddle 10 is returned to its FIG. 1 position. Likewise, when the normally open contact 1CR across the limit switches LS5 and the normally open contact 1CR connecting the coil of solenoid F to the power lines $L_1$ and $L_2$ are closed, the coils of solenoids E and F are energized and return the plows 54 and 55 to their FIG. 1 position.

Similarly, the normally open contact 1CR connected across the limit switch LS8 is closed upon depressing button V to energize the coil of solenoid I and thereby retract the adhesive applicator carriage and plate 104 to its FIG. 8 position.

The normally open contact 1CR in series with the limit switch LS11 and coil of solenoid K, is also closed to energize solenoid K and permit the movement of plate 90 upwardly to its FIG. 3 position. The normally open contact 1CR in circuit with the coils of solenoids M and L is closed whereby the bottom closure plate 102 is retracted to its FIG. 1 position and the platform section 4b is swung upwardly so as to be disposed in its FIG. 3 position to receive the next bale B to be closed.

The normally closed 1CR contacts in circuit with the coils of solenoids D, G, H, J and relay CR are each opened so as to prevent said solenoids and relay from being inadvertently energized during said resetting interval.

Thus by actuating the single reset button, each of the bale sealing components heretofore described are returned to their normal "rest" position in case a bale B becomes jammed in the apparatus or other malfunction thus incorporating a safety feature into said unit.

In FIGS. 14 through 17 I have herein disclosed a modified closure fold forming and closing apparatus which may be used in place of the plows 54 and 55 respectively.

As seen particularly in FIGS. 14 and 15, the modified assembly is seen to include a pair of plow members 302 and 303 each being rigidly secured to a block element 306.

The bale B as is shown in dotted lines, is disposed on the apparatus platform 4 and the plows 302 and 303 are thereafter moved through an arcuate path as indicated in FIG. 15, from a retracted position to a forward bale engaging position wherein said plows are operable to form the closure folds on the open end of the bale and move the side folds $f_1$ and $f_2$ to their closed position.

To accomplish this, each of the blocks 306 mounts a pin 310 adjacent each of its ends and onto which is journalled one end of a finger or link 312, the opposite end of one of said fingers being journalled upon a pin 314 mounted within a bracket arm 315. The opposite end of the remaining link 312 of each of said pair of links, being attached to one end of a shaft 318 so as to be rotatable with the same. Shaft 318 in turn, is journalled within bracket 315 adjacent its opposite end and extends vertically upwardly therefrom and is suitably journalled within support plate 320 attached to the machine framework 2. The opposite end of the shaft 318 is seen to mount one end of a crank arm 324 so as to be rotatable with the same, the opposite end of said crank arm being connected by pin 325 to one end of rod member 326. The opposite end of the rod member 326 is pivotally journalled at 328 to one end of a tie bar 332.

As best seen in FIGS. 16 and 17, a conventional double acting fluid motor, as identified at 335, has the free end of its piston rod 336 attached to the tie bar 332, said tie bar preferably mounting a pair of spaced shoes 339 which are intended to slidably move along spaced rails 340 to thus provide support and alignment for the actuation of the motor piston rod.

With this assembly, and with the hydraulic motor 335 connected into the fluid pressure system of the apparatus by means of conduits 337 and 338, said motor may be actuated whereby as seen in FIG. 15 the plows 302 and 303 are swung through an arcuate path from their solid line retracted position to their extended or forward position as is shown in dotted lines, whereby said plows engage the open end of the bale and form the closure folds thereon, and move the side folds $f_1$ and $f_2$ to their closed position over said end.

A reversible actuation of said motor returns said plows 302 and 303 to their retracted position to await the next bale being moved to the closure station Y.

Figure 18:
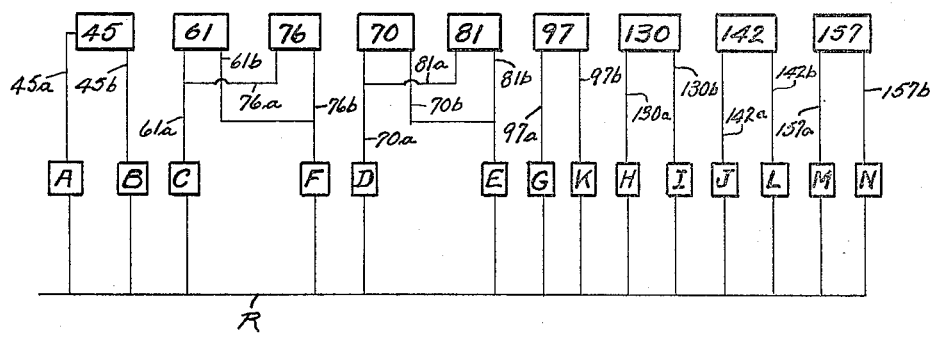
FIG. 18 is a side elevation of a modified closure folding device for the bottom closure flap of the bale.

In FIG. 18, a modified closure device is herein disclosed and is intended to swing the bottom closure fold $f_4$ of the bale upwardly and into its closed position effective to seal the bale.

In this assembly, the elevatable plate 102 is replaced by a rectangular plate 340 which is seen to be hingeably attached at 343 to the underside of the platform section 4b. A conventional double acting hydraulic motor 345 has its piston rod pivotally attached at 346 to the underside of said plate and its housing similarly connected to the apparatus framework 2 as is indicated at 350.

As will be understood, said motor is preferably connected by conduits 352 and 353 into the hydraulic control system of the apparatus.

The plate 340 is shown in its raised or elevated position wherein the bottom closure fold $f_4$ of the bale has been swung upwardly thereby and over the top closure fold $f_3$ effective to seal the bale.

From this position, the hydraulic motor 345 is actuatable to swing the plate 340 in a counterclockwise direction about its hingeable connection 343 and return said plate to a horizontal plane corresponding to the plane of the platform section 4b to thereby condition the apparatus to receive the next subsequent bale to be closed.

Having thus described several preferred embodiments of the bale closing and sealing apparatus of the present invention it will be realized that the same may be susceptible to various combinations, modifications and arrangements of parts without departing from the inventive concepts of this invention as are defined in the claims.

What is claimed is:

1. In an apparatus for closing and sealing the package sheet material extending outwardly from the open end of a bale, said apparatus including a generally flat platform extending in a given plane for supporting said bale with the open end facing in a given direction; a back-up rail extending above said platform and forming an aligning abutment for the closed end of said bale; first and second plate-like members selectively movable toward and away from each other along a path above said plane and generally parallel with said rail, said path being spaced from the rail only slightly further than the desired length of said bale; movement of said members toward each other being effective to form side folds and upper and lower flaps in said outwardly extending sheet material; a third plate-like member above said platform and selectively movable in a vertical direction to fold said upper flap over said side folds; a fourth plate-like member below said platform and selectively movable in a vertical direction to fold said lower flap over said side fold; means for applying an adhesive to at least one of said flaps; and sequencing means for folding said one flap over said folds after the other flap; the improvement comprising: said adhesive applying means including a head with adhesive applying protrusions, means for supporting said head, guide means for moving said support means and head first in a direction toward said bale and spaced from the inner surface of said one flap with said protrusions facing said one flap, means for moving said head vertically until said protrusions contact and apply a given pattern of adhesive onto the inner surface of said one flap, and means for first vertically moving said head from said one flap and then retracting said head from said bale.

2. The improvement as defined in claim 1 wherein said one flap is said lower flap.

3. The improvement as defined in claim 2 wherein said fourth plate-like member includes a generally perpendicular plate at the upper end of said fourth member, said plate forming a generally flat surface for supporting said lower flap during adhesive application, said plate being movable upwardly with said fourth member after the adhesive is applied.

4. The improvement as defined in claim 2 wherein said third plate-like member includes a generally perpendicular flap hold-down element, said element being contoured to contact said lower flap in a manner to avoid said adhesive pattern, said hold-down element having a thickness substantially less than the projecting height of said protrusions.

5. The improvement as defined in claim 1 including means, actuated after the first of said third and fourth plate-like members has folded said other flap over said folds, for moving said first of said third and fourth members away from said bale in unison with movement of the second of said third and fourth plate-like members toward said bale whereby said adhesive containing one flap is progressively applied over said other flap while said other flap is being progressively released by said first of said third and fourth members.

6. The improvement as defined in claim 1 including an adhesive applicator in the path of said protrusions as said head is moving toward said bale.

7. The improvement as defined in claim 6 wherein said applicator is a roll rotatably mounted in a supply of adhesive, said supply being positioned on the opposite side of said roll from said path of movement of said head.

8. The improvement as defined in claim 1 wherein said guide means includes spaced rails on opposite sides of said head support means, said rails having grooves extending toward said open end of said bale, said support means including followers received in said grooves.

9. The improvement as defined in claim 8 wherein said means for moving said head vertically includes vertically extending grooves on said rails and at the end of said first mentioned grooves adjacent said bale.

10. In an apparatus for closing and sealing the package sheet material extending outwardly from the open end of a bale, said apparatus including a generally flat platform extending in a given plane for supporting said bale with the open end facing in a given direction; a back-up rail extending above said platform and forming an aligning abutment for the closed end of said bale; first and second plate-like members selectively movable toward and away from each other along a path above said plane and generally parallel with said rail, said path being spaced from the rail only slightly further than the desired length of said bale; movement of said members toward each other being effective to form side folds and upper and lower flaps in said outwardly extending sheet material; a third plate-like member above said platform and selectively movable in a vertical direction to fold said upper flap over said side folds; a fourth plate-like member below said platform and selectively movable in a vertical direction to fold said lower flap over said side fold; means for applying an adhesive to at least one of said flaps; and sequencing means for folding said one flap over said folds after the other flap; the improvement comprising: said fourth plate-like member including a generally perpendicular plate at the upper end thereof, said plate forming a generally flat surface for supporting said lower flap, said one flap being said lower flap, said plate being movable upwardly with said fourth member after said adhesive is applied to said lower flap.

References Cited by the Examiner
UNITED STATES PATENTS

| | | | |
|---|---|---|---|
| 1,008,197 | 11/1911 | Richter et al. | 53—218 |
| 1,590,366 | 6/1926 | Grimm et al. | 53—232 X |
| 1,942,017 | 1/1934 | Baldwin | 53—218 X |
| 2,241,751 | 5/1941 | Van Wart | 53—383 X |
| 2,716,852 | 9/1955 | Kindseth | 53—378 |
| 2,846,834 | 8/1958 | Spriggs | 53—76 X |
| 3,016,673 | 1/1962 | Parker | 53—390 |
| 3,035,938 | 5/1962 | Schwinger | 53—383 X |
| 3,078,633 | 2/1963 | Stromberg et al. | 53—378 |
| 3,110,144 | 11/1963 | Johansen et al. | 53—232 X |

TRAVIS S. McGEHEE, *Primary Examiner.*